(12) United States Patent
Yum et al.

(10) Patent No.: US 11,246,051 B2
(45) Date of Patent: Feb. 8, 2022

(54) METHOD AND APPARATUS FOR INTERFERENCE MEASUREMENT IN WIRELESS COMMUNICATION SYSTEM

(71) Applicant: LG Electronics Inc., Seoul (KR)

(72) Inventors: Kunil Yum, Seoul (KR); Jiwon Kang, Seoul (KR); Kijun Kim, Seoul (KR); Hyungtae Kim, Seoul (KR); Haewook Park, Seoul (KR)

(73) Assignee: LG Electronics Inc., Seoul (KR)

( * ) Notice: Subject to any disclaimer, the term of this patent is extended or adjusted under 35 U.S.C. 154(b) by 65 days.

(21) Appl. No.: 16/636,564

(22) PCT Filed: Aug. 3, 2018

(86) PCT No.: PCT/KR2018/008827
§ 371 (c)(1),
(2) Date: Feb. 4, 2020

(87) PCT Pub. No.: WO2019/027281
PCT Pub. Date: Feb. 7, 2019

(65) Prior Publication Data
US 2021/0160718 A1 May 27, 2021

Related U.S. Application Data

(60) Provisional application No. 62/541,112, filed on Aug. 4, 2017.

(51) Int. Cl.
*H04W 72/08* (2009.01)
*H04W 24/10* (2009.01)
(Continued)

(52) U.S. Cl.
CPC ......... *H04W 24/10* (2013.01); *H04L 5/0073* (2013.01); *H04W 28/0967* (2020.05); *H04W 72/082* (2013.01)

(58) Field of Classification Search
CPC ............ H04W 24/10; H04W 28/0967; H04W 72/082; H04L 5/0073
See application file for complete search history.

(56) References Cited

U.S. PATENT DOCUMENTS

2012/0093116 A1* 4/2012 Kim ................ H04L 1/1861
370/329
2014/0056272 A1 2/2014 Gao et al.
(Continued)

FOREIGN PATENT DOCUMENTS

KR 20110104103 9/2011
KR 20140074341 6/2014
(Continued)

OTHER PUBLICATIONS

PCT International Search Report and Written Opinion in International Application No. PT/KR2018/008827, dated Nov. 16, 2018, 15 pages.

*Primary Examiner* — Brian P Cox
(74) *Attorney, Agent, or Firm* — Fish & Richardson P.C.

(57) ABSTRACT

A method for measuring and reporting an interference by using a port-wise interference measurement resource in a wireless communication system according to an embodiment of the present disclosure may comprise the steps of: receiving a configuration associated with a port-wise interference measurement resource, wherein the port-wise interference measurement resource corresponds to an independent interference assumption for each port; and measuring an interference for each port in the port-wise interference measurement resource, and reporting a measurement result, wherein the measurement result includes an index of a port having a channel quality indicator (CQI) exceeding a target CQI.

8 Claims, 14 Drawing Sheets

(51) Int. Cl.
*H04W 28/08* (2009.01)
*H04L 5/00* (2006.01)

(56) References Cited

U.S. PATENT DOCUMENTS

| | | | | |
|---|---|---|---|---|
| 2014/0192917 A1* | 7/2014 | Nam | .................... | H04L 5/0023 375/267 |
| 2014/0362939 A1* | 12/2014 | Kuo | .................... | H04B 7/0634 375/267 |
| 2016/0226538 A1* | 8/2016 | Kim | ....................... | H04B 1/123 |
| 2018/0077551 A1* | 3/2018 | Kalathil | ................ | H04W 72/10 |

FOREIGN PATENT DOCUMENTS

| | | |
|---|---|---|
| KR | 20150082448 | 7/2015 |
| WO | WO 2016/163841 | 10/2016 |

* cited by examiner

I2 is Cancelled Using Walsh Code

I1 and n are Cancelled Using Walsh Code

I2 is Cancelled Using Walsh Code

I1 is Cancelled Using Walsh Code

METHOD AND APPARATUS FOR INTERFERENCE MEASUREMENT IN WIRELESS COMMUNICATION SYSTEM

CROSS-REFERENCE TO RELATED APPLICATIONS

This application is a National Stage application under 35 U.S.C. § 371 of International Application No. PCT/KR2018/008827, filed on Aug. 3, 2018, which claims the benefit of U.S. Provisional Application No. 62/541,112, filed on Aug. 4, 2017. The disclosures of the prior applications are incorporated by reference in their entirety.

TECHNICAL FIELD

The present disclosure relates to a wireless communication system, and more particularly, to a method and apparatus for measuring interference.

BACKGROUND ART

The necessity for mobile broadband communication much improved than the conventional radio access technology (RAT) has increased as a number of communication devices has required higher communication capacity. In addition, massive machine type communications (MTC) capable of providing various services anytime and anywhere by connecting a number of devices or things to each other has been considered as a main issue in the next generation communications. Moreover, a communication system design capable of supporting services sensitive to reliability and latency has been discussed. The introduction of next-generation RAT considering enhanced mobile broadband communication (eMBB), massive MTC (mMTC), ultra-reliable and low latency communication (URLLC), etc. has been discussed. In the present disclosure, the corresponding technology is referred to as new RAT for convenience of description.

DISCLOSURE

Technical Problem

An aspect of the present disclosure devised to solve the conventional problem is to provide a method of measuring interference.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an embodiment of the present disclosure, a method of measuring interference in a port-wise interference measurement resource and reporting the interference in a wireless communication system includes receiving a configuration related to the port-wise interference measurement resource, the port-wise interference measurement resource being related to an independent interference hypothesis for each port, and measuring interference for each port in the port-wise interference measurement resource and reporting a measurement result. The measurement result may include an index of a port having a channel quality indicator (CQI) exceeding a target CQI.

Additionally or alternatively, the measurement result may include indexes of a plurality of ports, and a CQI based on interference for each of the plurality of ports may exceed the target CQI.

Additionally or alternatively, the measurement result may include indexes of a plurality of ports, and a CQI derived based on total interference of the plurality of ports may exceed the target CQI.

Additionally or alternatively, the measurement result may include information about indexes of a plurality of port groups, and each of the port groups may include a plurality of ports, each port having a CQI derived based on total interference of the plurality of ports exceeding the target CQI.

Additionally or alternatively, the method may further include receiving information related to a CQI drop, and reporting an index of a port for which interference within a range satisfying the CQI drop has been measured.

Additionally or alternatively, the configuration related to the port-wise interference measurement resource may include a port-wise measurement restriction (MR).

Additionally or alternatively, the configuration related to the port-wise interference measurement resource may include information indicating whether each port is a channel measurement port, a non-zero power interference measurement port, or a zero power interference measurement port, for each interference measurement resource.

According to another embodiment of the present disclosure, a UE for measuring interference in a wireless communication system includes a transceiver and a processor configured to control the transceiver. The processor is configured to receive a configuration related to the port-wise interference measurement resource, the port-wise interference measurement resource being related to an independent interference hypothesis for each port, and measure interference for each port in the port-wise interference measurement resource and reporting a measurement result. The measurement result may include an index of a port having a CQI exceeding a target CQI.

Additionally or alternatively, the measurement result may include indexes of a plurality of ports, and a CQI based on interference for each of the plurality of ports may exceed the target CQI.

Additionally or alternatively, the measurement result may include indexes of a plurality of ports, and a CQI derived based on total interference of the plurality of ports may exceed the target CQI.

Additionally or alternatively, the measurement result may include information about indexes of a plurality of port groups, and each of the port groups may include a plurality of ports, each port having a CQI derived based on total interference of the plurality of ports exceeding the target CQI.

Additionally or alternatively, the processor may be configured to receive information related to a CQI drop, and report an index of a port for which interference within a range satisfying the CQI drop has been measured.

Additionally or alternatively, the configuration related to the port-wise interference measurement resource may include a port-wise MR.

Additionally or alternatively, the configuration related to the port-wise interference measurement resource may include information indicating whether each port is a channel measurement port, a non-zero power interference measurement port, or a zero power interference measurement port, for each interference measurement resource.

Additionally or alternatively, the UE is a part of an autonomous driving device that communicates with at least one of a network or another autonomous driving vehicle.

The above-described aspects of the present disclosure are merely parts of the embodiments of the present disclosure. It will be understood by those skilled in the art that various embodiments are derived from the following detailed description of the present disclosure without departing from the technical features of the disclosure.

Advantageous Effects

According to the embodiments of the present disclosure, interference may be measured efficiently.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

BEST MODE

Figure 1:
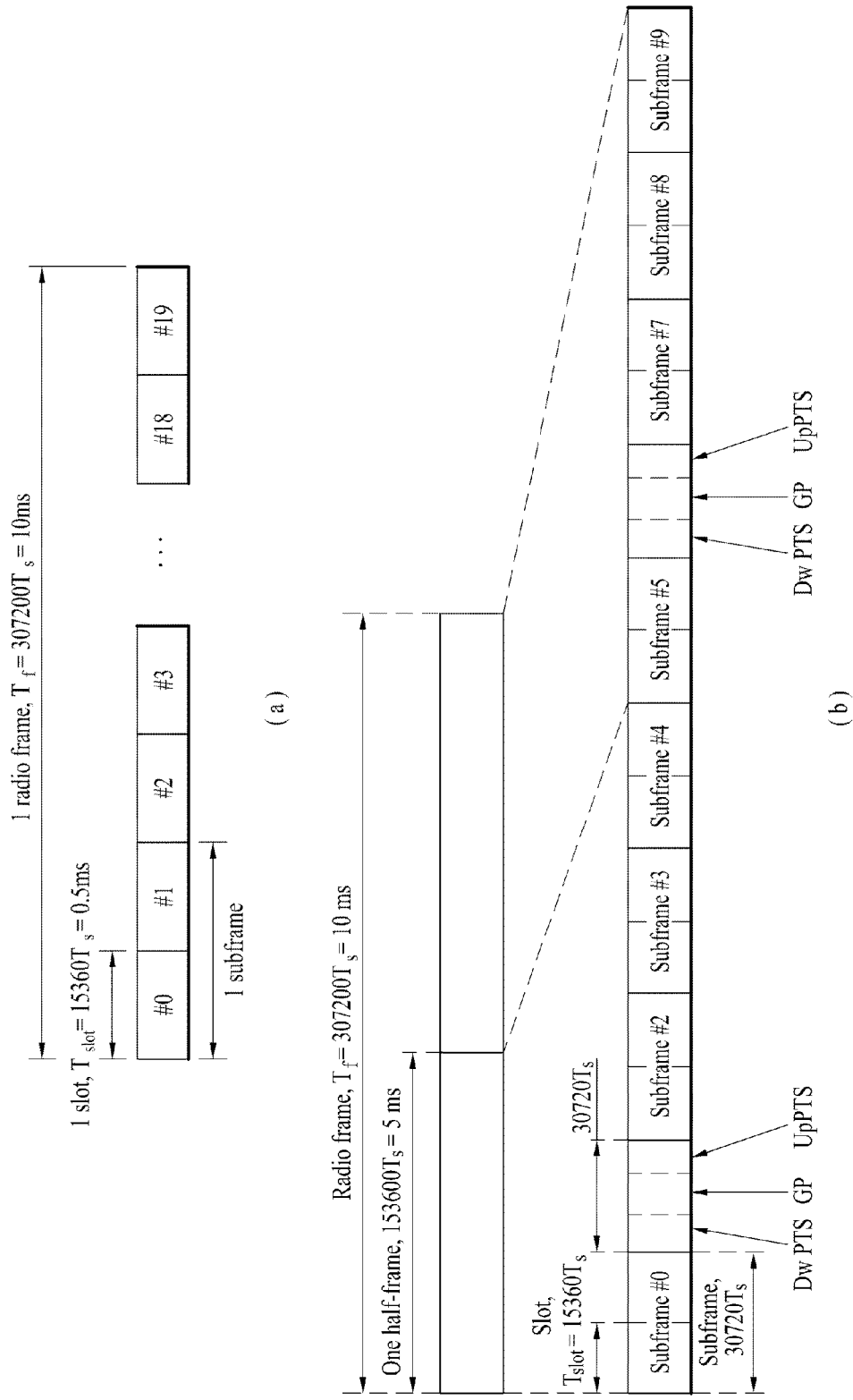
FIG. 1 is a diagram illustrating an exemplary radio frame structure used in a wireless communication system.

Reference will now be made in detail to the preferred embodiments of the present disclosure, examples of which are illustrated in the accompanying drawings. The accompanying drawings illustrate exemplary embodiments of the present disclosure and provide a more detailed description of the present disclosure. However, the scope of the present disclosure should not be limited thereto.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present disclosure, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term 'BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present disclosure, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present disclosure, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional multiple input multiple output (MIMO) systems, conventional relay systems, conventional repeater systems, etc.) since a plurality of nodes provides communication services to a UE in a predetermined time-frequency resource. Accordingly, embodiments of the present disclosure with respect to a method of performing coordinated data transmission using some or all nodes can be applied to various types of multi-node systems. For example, a node refers to an antenna group spaced apart from another node by a predetermined distance or more, in general. However, embodiments of the present disclosure, which will be described below, can even be applied to a case in which a node refers to an arbitrary antenna group irrespective of node interval. In the case of an eNB including an X-pole (cross polarized) antenna, for example, the embodiments of the preset disclosure are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink (DL) signal is discriminated from a node transmitting an uplink (UL) signal is called multi-eNB MIMO or coordinated multi-point Tx/Rx (CoMP). Coordinated transmission schemes from among CoMP communication schemes can be categorized into joint processing (JP) and scheduling coordination. The former may be divided into joint transmission (JT)/joint reception (JR) and dynamic point selection (DPS) and the latter may be divided into coordinated scheduling (CS) and coordinated beamforming (CB). DPS may be called dynamic cell selection (DCS). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/ received through a node selected from plural nodes according to a specific rule. In the case of DPS, signal transmission reliability can be improved because a node having a good channel state between the node and a UE is selected as a communication node.

In the present disclosure, a cell refers to a specific geographical area in which one or more nodes provide communication services. Accordingly, communication with a specific cell may mean communication with an eNB or a node providing communication services to the specific cell. A DL/UL signal of a specific cell refers to a DL/UL signal from/to an eNB or a node providing communication services to the specific cell. A cell providing UL/DL communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure DL channel state from a specific node using one or more channel state information reference signals (CSI-RSs) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present disclosure, physical DL control channel (PDCCH)/physical control format indicator channel (PCFICH)/physical hybrid automatic repeat request indicator channel (PHICH)/physical DL shared channel (PDSCH) refer to a set of time-frequency resources or resource elements respectively carrying DL control information (DCI)/ control format indicator (CFI)/DL acknowledgement/negative acknowledgement (ACK/NACK)/DL data. In addition, physical UL control channel (PUCCH)/physical UL shared channel (PUSCH)/physical random access channel (PRACH) refer to sets of time-frequency resources or resource elements respectively carrying UL control information (UCI)/UL data/random access signals. In the present disclosure, a time-frequency resource or a resource element (RE), which is allocated to or belongs to PDCCH/PCFICH/ PHICH/PDSCH/PUCCH/PUSCH/PRACH, is referred to as a PDCCH/PCFICH/PHICH/PDSCH/PUCCH/PUSCH/ PRACH RE or PDCCH/PCFICH/PHICH/PDSCH/PUCCH/ PUSCH/PRACH resource. In the following description, transmission of PUCCH/PUSCH/PRACH by a UE is equivalent to transmission of UL control information/UL data/random access signal through or on PUCCH/PUSCH/ PRACH. Furthermore, transmission of PDCCH/PCFICH/ PHICH/PDSCH by an eNB is equivalent to transmission of DL data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/ LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. DL transmission is discriminated from UL transmission by frequency in FDD mode, and thus the radio frame includes only one of a DL subframe and an UL subframe in a specific frequency band. In TDD mode, DL transmission is discriminated from UL transmission by time, and thus the radio frame includes both a DL subframe and an UL subframe in a specific frequency band.

Table 1 shows DL-UL configurations of subframes in a radio frame in the TDD mode.

TABLE 1

| DL-UL config-uration | Downlink-to-Uplink Switch-point periodicity | Subframe number |
|---|---|---|
| 0 | 5 ms | |
| 1 | 5 ms | |
| 2 | 5 ms | |
| 3 | 10 ms | |
| 4 | 10 ms | |
| 5 | 10 ms | |
| 6 | 5 ms | |

In Table 1, D denotes a DL subframe, U denotes an UL subframe and S denotes a special subframe. The special subframe includes three fields of DL pilot time slot (DwPTS), guard period (GP), and UL pilot time slot (UpPTS). DwPTS is a period reserved for DL transmission and UpPTS is a period reserved for UL transmission. Table 2 shows special subframe configuration.

TABLE 2

| | Normal cyclic prefix in DL | | | Extended cyclic prefix in DL | | |
|---|---|---|---|---|---|---|
| | | UpPTS | | | UpPTS | |
| Special subframe configuration | DwPTS | Normal cyclic prefix in UL | Extended cyclic prefix in UL | DwPTS | Normal cyclic prefix in UL | Extended cyclic prefix in UL |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Figure 2:
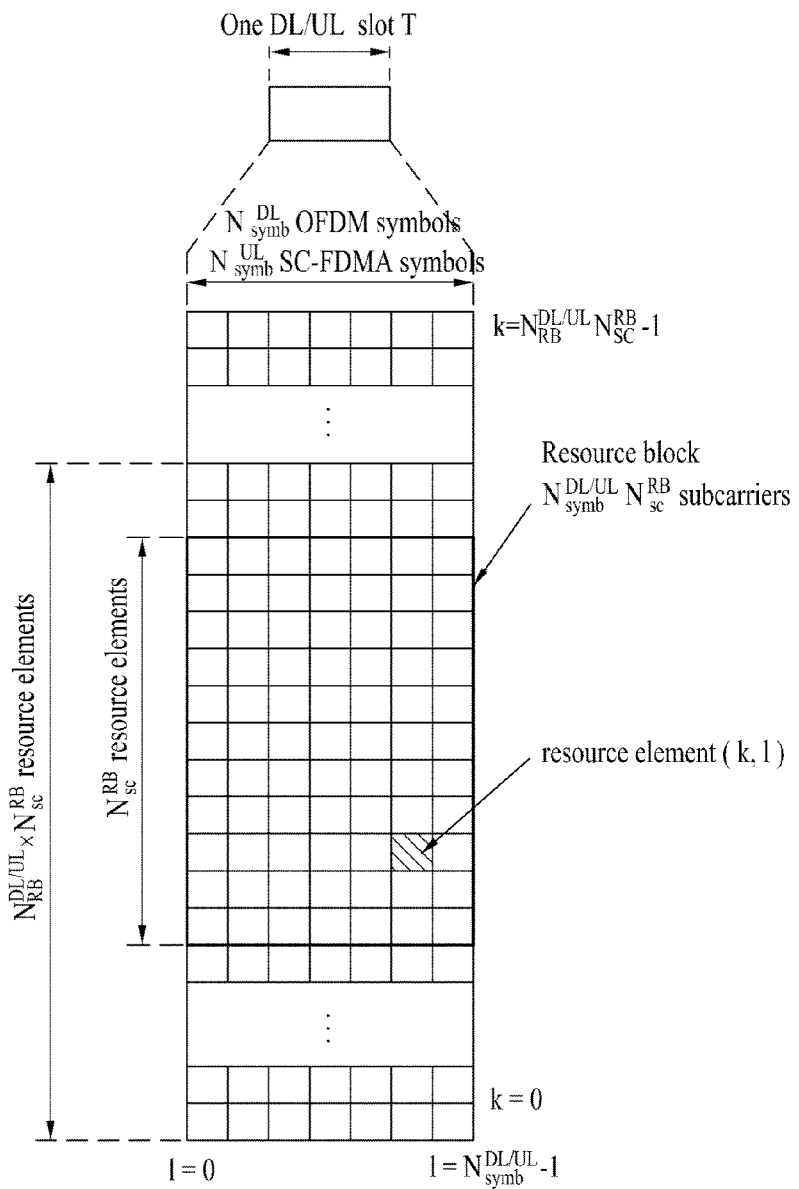
FIG. 2 is a diagram illustrating an exemplary downlink (DL)/uplink (UL) slot structure in a wireless communication system.

FIG. 2 illustrates an exemplary DL/UL slot structure in a wireless communication system. Particularly, FIG. 2 illustrates a resource grid structure in 3GPP LTE/LTE-A. A resource grid is present per antenna port.

Referring to FIG. 2, a slot includes a plurality of orthogonal frequency division multiplexing (OFDM) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a DL slot and $N_{RB}^{UL}$ denotes the number of RBs in an UL slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the DL slot and $N_{symb}^{UL}$ denotes the number of OFDM symbols in the UL slot. In addition, $N_{sc}^{RB}$ denotes the number of subcarriers constructing one RB.

An OFDM symbol may be called an single carrier frequency division multiplexing (SC-FDM) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present disclosure can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, 1) in a slot. Here, k is an index in the range of 0 to $N_{symb}^{DL/UL} * N_{sc}^{RB} - 1$ in the frequency domain and 1 is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB}=n_{VRB}$ is obtained. Numbers are given to the localized VRBs from 0 to $N_{VRB}^{DL}-1$, and $N_{VRB}^{DL}=N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
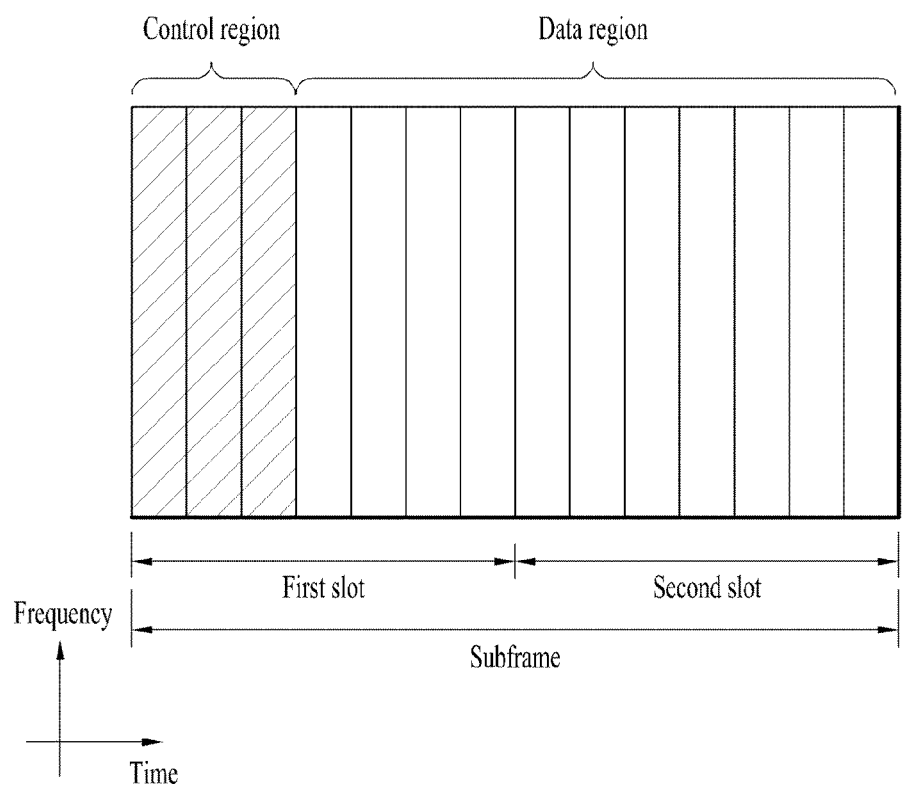
FIG. 3 is a diagram illustrating an exemplary DL subframe structure used in a $3^{rd}$ generation partnership project (3GPP) long term evolution (LTE)/long term evolution-advanced (LTE-A) system.

FIG. 3 illustrates a DL subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a PDSCH is allocated. A resource region available for PDSCH transmission in the DL subframe is referred to as a PDSCH region hereinafter. Examples of DL control channels used in 3GPP LTE include a PCFICH, a PDCCH, a PHICH, etc. The PCFICH is transmitted at a first OFDM symbol of a subframe and carries information regarding the number of OFDM symbols used for transmission of control channels within the subframe. The PHICH is a response of UL transmission and carries an HARQ ACK/NACK signal.

Control information carried on the PDCCH is called DCI. The DCI contains resource allocation information and control information for a UE or a UE group. For example, the DCI includes a transport format and resource allocation information of a DL shared channel (DL-SCH), a transport format and resource allocation information of an UL shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), DL assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for UL and formats 1, 1A, 1B, 1C, 1D, 2, 2A, 2B, 2C, 3 and 3A for DL, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a PDSCH may be allocated to the data region. A PCH and DL-SCH are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is cyclic redundancy check (CRC)-masked having radio network temporary identify (RNTI) of "A" and information about data transmitted using a radio resource (e.g., frequency position) of "B" and transmission format information (e.g., transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of DL data for a specific UE is called a UE-specific RS. Both or one of DM RS and CRS may be transmitted on DL. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
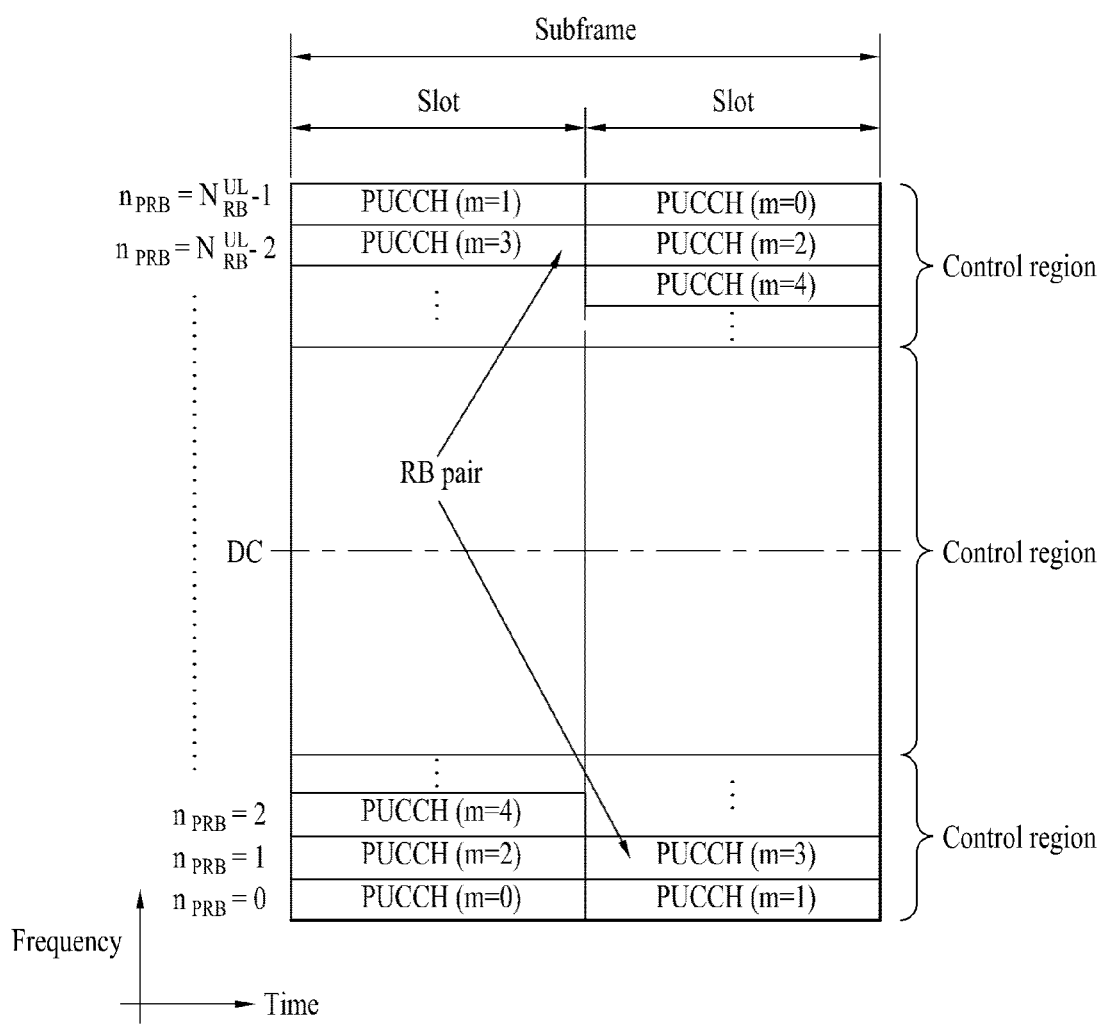
FIG. 4 is a diagram illustrating an exemplary UL subframe structure used in the 3GPP LTE/LTE-A system.

FIG. 4 illustrates an exemplary UL subframe structure used in 3GPP LTE/LTE-A.

Referring to FIG. 4, a UL subframe can be divided into a control region and a data region in the frequency domain. One or more PUCCHs (physical UL control channels) can be allocated to the control region to carry UCI. One or more PUSCHs may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a DL data packet on a PDSCH and indicates whether the DL data packet has been successfully received. A 1-bit ACK/NACK signal is transmitted as a response to a single DL codeword and a 2-bit ACK/NACK signal is transmitted as a response to two DL codewords. HARQ-ACK responses include positive ACK, NACK, discontinuous transmission (DTX) and NACK/DTX. Here, the term HARQ-ACK is used interchangeably with the term HARQ ACK/NACK and ACK/NACK.

Channel State Indicator (CSI): This is feedback information about a DL channel. Feedback information regarding MIMO includes an RI and a PMI.

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon.

Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
|---|---|---|---|---|
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an UL reference signal and a DL reference signal. In LTE, the UL reference signal includes:

i) a demodulation reference signal (DMRS) for channel estimation for coherent demodulation of information transmitted through a PUSCH and a PUCCH; and ii) a sounding reference signal (SRS) used for an eNB to measure UL channel quality at a frequency of a different network.

The DL reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a DL DMRS is transmitted;

v) a multimedia broadcast single frequency network (MBSFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on DL transmission and received by a UE even if the UE does not receive DL data in a specific subframe. This reference signal is used even in a handover situation. The latter is transmitted along with a corresponding resource by an eNB when the eNB transmits a DL signal and is used for a UE to demodulate data through channel measurement. This reference signal needs to be transmitted in a region in which data is transmitted.

CSI Reporting

In the 3GPP LTE(-A) system, a user equipment (UE) is defined to report CSI to a BS. Herein, the CSI collectively refers to information indicating the quality of a radio channel (also called a link) created between a UE and an antenna port. The CSI includes, for example, a rank indicator (RI), a precoding matrix indicator (PMI), and a channel quality indicator (CQI). Herein, the RI, which indicates rank information about a channel, refers to the number of streams that a UE receives through the same time-frequency resource. The RI value is determined depending on long-term fading of the channel, and is thus usually fed back to the BS by the UE with a longer period than for the PMI and CQI. The PMI, which has a value reflecting the channel space property, indicates a precoding index preferred by the UE based on a metric such as SINR. The CQI, which has a value indicating the intensity of a channel, typically refers to a receive SINR which may be obtained by the BS when the PMI is used.

The UE calculates, based on measurement of the radio channel, a preferred PMI and RI from which an optimum or highest transmission rate may be derived when used by the BS in the current channel state, and feeds back the calculated PMI and RI to the BS. Herein, the CQI refers to a modulation and coding scheme providing an acceptable packet error probability for the PMI/RI that is fed back.

Meanwhile, in the LTE-A system expected to include finer MU-MIMO and explicit CoMP operations, current CSI feedback is defined in LTE and cannot sufficiently support such operations to be newly employed. As the requirements for CSI feedback accuracy become complicated to obtain sufficient MU-MIMO or CoMP throughput gain, they agreed to configure PMI with two types of long term/wideband PMI ($W_1$) and short term/subband PMI ($W_2$). So to speak, final PMI is expressed as a function of $W_1$ and $W_2$. For example, final PMI W may be defined as follows: $W=W_1*W_2$ or $W=W_2*W_1$. Hence, in LTE-A, CSI shall be configured with RI, $W_1$, $W_2$ and CQI.

In the 3GPP LTE(-A) system, an uplink channel used for CSI transmission is configured as shown in Table 5.

TABLE 5

| Scheduling scheme | Periodic CSI transmission | Aperiodic CSI transmission |
|---|---|---|
| Frequency non-selective | PUCCH | — |
| Frequency selective | PUCCH | PUSCH |

Referring to Table 5, CSI may be transmitted with a periodicity defined in a higher layer, using a physical uplink control channel (PUCCH). When needed by the scheduler, a physical uplink shared channel (PUSCH) may be aperiodically used to transmit the CSI. Transmission of the CSI over the PUSCH is possible only in the case of frequency selective scheduling and aperiodic CSI transmission. Hereinafter, CSI transmission schemes according to scheduling schemes and periodicity will be described.

1) Transmitting the CQI/PMI/RI Over the PUSCH after Receiving a CSI Transmission Request Control Signal (a CSI Request)

A PUSCH scheduling control signal (UL grant) transmitted over a PDCCH may include a control signal for requesting transmission of CSI. The table below shows modes of the UE in which the CQI, PMI and RI are transmitted over the PUSCH.

TABLE 6

|  |  | PMI Feedback Type | | |
|---|---|---|---|---|
|  |  | No PMI | Single PMI | Multiple PMIs |
| PUSCH CQI Feedback Type | Wideband (Wideband CQI) |  |  | Mode 1-2 RI 1st wideband CQI(4 bit) 2nd wideband CQI(4 bit) if RI > 1 N*Subband PMI(4 bit) (N is the total # of subbands) (if 8Tx Ant, N*subband W2 + wideband W1) |
|  | UE selected (Subband CQI) | Mode 2-0 RI (only for Open-loop SM) 1st wideband CQI(4 bit) + Best-M CQI(2 bit) (Best-M CQI: An average CQI for M SB(s) selected from among N SBs) Best-M index (L bit) |  | Mode 2-2 RI 1st wideband CQI(4 bit) + Best-M CQI(2 bit) 2nd wideband CQI(4 bit) + Best-M CQI(2 bit) if RI > 1 Best-M index (L bit) Wideband PMI(4 bit) + Best-M PMI(4 bit) |

TABLE 6-continued

| | PMI Feedback Type | | |
|---|---|---|---|
| | No PMI | Single PMI | Multiple PMIs |
| Higher Layer-configured (Subband CQI) | Mode 3-0 RI (only for Open-loop SM) 1st wideband CQI(4 bit) + N*subbandCQI(2 bit) | Mode 3-1 RI 1st wideband CQI(4 bit) + N*subbandCQI(2 bit) 2nd wideband CQI(4 bit) + N*subbandCQI(2 bit) if RI > 1 Wideband PMI(4 bit) (if 8Tx Ant, wideband W2 + wideband W1) | (if 8Tx Ant, wideband W2 + Best-M W2 + wideband W1) Mode 3-2 RI 1st wideband CQI(4 bit) + N*subbandCQI(2 bit) 2nd wideband CQI(4 bit) + N*subbandCQI(2 bit) if RI > 1 N*Subband PMI(4 bit) (N is the total # of subbands) (if 8Tx Ant, N*subband W2 + wideband W1) |

The transmission modes in Table 6 are selected in a higher layer, and the CQI/PMI/RI are all transmitted in a PUSCH subframe. Hereinafter, uplink transmission methods for the UE according to the respective modes will be described.

Mode 1-2 represents a case where precoding matrices are selected on the assumption that data is transmitted only in subbands. The UE generates a CQI on the assumption of a precoding matrix selected for a system band or a whole band (set S) designated in a higher layer. In Mode 1-2, the UE may transmit a CQI and a PMI value for each subband. Herein, the size of each subband may depend on the size of the system band.

A UE in Mode 2-0 may select M preferred subbands for a system band or a band (set S) designated in a higher layer. The UE may generate one CQI value on the assumption that data is transmitted for the M selected subbands. Preferably, the UE additionally reports one CQI (wideband CQI) value for the system band or set S. If there are multiple codewords for the M selected subbands, the UE defines a CQI value for each codeword in a differential form.

In this case, the differential CQI value is determined as a difference between an index corresponding to the CQI value for the M selected subbands and a wideband (WB) CQI index.

The UE in Mode 2-0 may transmit, to a BS, information about the positions of the M selected subbands, one CQI value for the M selected subbands and a CQI value generated for the whole band or designated band (set S). Herein, the size of a subband and the value of M may depend on the size of the system band.

A UE in Mode 2-2 may select positions of M preferred subbands and a single precoding matrix for the M preferred subbands simultaneously on the assumption that data is transmitted through the M preferred subbands. Herein, a CQI value for the M preferred subbands is defined for each codeword. In addition, the UE additionally generates a wideband CQI value for the system band or a designated band (set S).

The UE in Mode 2-2 may transmit, to the BS, information about the positions of the M preferred subbands, one CQI value for the M selected subbands and a single PMI for the M preferred subbands, a wideband PMI, and a wideband CQI value. Herein, the size of a subband and the value of M may depend on the size of the system band.

A UE in Mode 3-0 generates a wideband CQI value. The UE generates a CQI value for each subband on the assumption that data is transmitted through each subband. In this case, even if RI >1, the CQI value represents only the CQI value for the first codeword.

A UE in Mode 3-1 generates a single precoding matrix for the system band or a designated band (set S). The UE generates a CQI subband for each codeword on the assumption of the single precoding matrix generated for each subband. In addition, the UE may generate a wideband CQI on the assumption of the single precoding matrix. The CQI value for each subband may be expressed in a differential form. The subband CQI value is calculated as a difference between the subband CQI index and the wideband CQI index. Herein, the size of each subband may depend on the size of the system band.

A UE in Mode 3-2 generates a precoding matrix for each subband in place of a single precoding matrix for the whole band, in contrast with the UE in Mode 3-1.

2) Periodic CQI/PMI/RI Transmission Over PUCCH

The UE may periodically transmit CSI (e.g., CQI/PMI/PTI (precoding type indicator) and/or RI information) to the BS over a PUCCH. If the UE receives a control signal instructing transmission of user data, the UE may transmit a CQI over the PUCCH. Even if the control signal is transmitted over a PUSCH, the CQI/PMI/PTI/RI may be transmitted in one of the modes defined in the following table.

TABLE 7

| | | PMI feedback type | |
|---|---|---|---|
| | | No PMI | Single PMI |
| PUCCH CQI feedback type | Wideband (wideband CQI) | Mode 1-0 | Mode 1-1 |
| | UE selective (subband CQI) | Mode 2-0 | Mode 2-1 |

A UE may be set in transmission modes as shown in Table 7. Referring to Table 7, in Mode 2-0 and Mode 2-1, a bandwidth part (BP) may be a set of subbands consecutively positioned in the frequency domain, and cover the system band or a designated band (set S). In Table 7, the size of each subband, the size of a BP and the number of BPs may depend on the size of the system band. In addition, the UE transmits CQIs for respective BPs in ascending order in the frequency domain so as to cover the system band or designated band (set S).

The UE may have the following PUCCH transmission types according to a transmission combination of CQI/PMI/PTI/RI.

i) Type 1: the UE transmits a subband (SB) CQI of Mode 2-0 and Mode 2-1.
ii) Type 1a: the UE transmits an SB CQI and a second PMI.
iii) Types 2, 2b and 2c: the UE transmits a WB-CQI/PMI.
iv) Type 2a: the UE transmits a WB PMI.
v) Type 3: the UE transmits an RI.
vi) Type 4: the UE transmits a WB CQI.
vii) Type 5: the UE transmits an RI and a WB PMI.
viii) Type 6: the UE transmits an RI and a PTI.
ix) Type 7: the UE transmits a CRI (CSI-RS resource indicator) and an RI.
x) Type 8: the UE transmits a CRI, an RI and a WB PMI.
xi) Type 9: the UE transmits a CRI, an RI and a PTI (precoding type indication).
xii) Type 10: the UE transmits a CRI.

When the UE transmits an RI and a WB CQI/PMI, the CQI/PMI are transmitted in subframes having different periodicities and offsets. If the RI needs to be transmitted in the same subframe as the WB CQI/PMI, the CQI/PMI are not transmitted.

Aperiodic CSI Request

If a carrier aggregation (CA) environment is considered, a 2-bit CSI request field is used in DCI format 0 or 4, for an aperiodic CSI feedback in the current LTE standards. If a plurality of serving cells are configured for a UE in the CA environment, the UE interprets the CSI request field in 2 bits. If one of TM 1 to TM 9 is configured for every component carrier (CC), an aperiodic CSI feedback is triggered according to values listed in Table 8 below. If TM 10 is configured for at least one of all CCs, an aperiodic CSI feedback is triggered according to values listed in Table 9 below.

TABLE 8

| Values of CSI request field | Description |
| --- | --- |
| '00' | Aperiodic CSI reporting is not triggered |
| '01' | Aperiodic CSI reporting is triggered for serving cell |
| '10' | Aperiodic CSI reporting is triggered for a first set of serving cells configured by higher layer |
| '11' | Aperiodic CSI reporting is triggered for a second set of serving cells configured by higher layer |

TABLE 9

| Values of CSI request field | Description |
| --- | --- |
| '00' | Aperiodic CSI reporting is not triggered |
| '01' | Aperiodic CSI reporting is triggered for CSI process set configured for serving cell by higher layer |
| '10' | Aperiodic CSI reporting is triggered for a first set of CSI processes configured by higher layer |
| '11' | Aperiodic CSI reporting is triggered for a second set of CSI processes configured by higher layer |

New Radio Technology (NR)

Now, a description will be given of a new radio access technology (RAT) system. As more and more communication devices demand larger communication capacities, the need for enhanced mobile broadband communication relative to legacy RATs has been pressing. There is also a need for massive machine type communication (MTC) which provides various services anytime, anywhere by connecting multiple devices and things to one another. Furthermore, a communication system reflecting services/UEs sensitive to reliability and latency has been designed.

A new RAT system has been proposed in consideration of enhanced mobile broadband communication, massive MTC, ultra-reliable and low-latency communication (URLLC), and so on. In the present disclosure, this technology is referred to as New RAT or New Radio (NR), for the convenience' sake.

An NR system to which the present disclosure is applicable supports various OFDM numerologies as listed in the following table. A subcarrier spacing (SCS) $\mu$ and CP information for each carrier bandwidth part (BWP) may be signaled on DL or UL. For example, an SCS and CP information for a DL carrier BWP may be signaled by higher-layer signaling, DL-BWP-mu and DL-MWP-cp. In another example, $\mu$ and CP information for a UL carrier BWP may be signaled by higher-layer signaling, UL-BWP-mu and UL-MWP-cp.

TABLE 10

| $\mu$ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

In NR, a 10-ms frame is configured for DL transmission and UL transmission. The frame may include 10 1-ms subframes. The number of contiguous OFDM symbols per subframe is given by $N_{symb}^{subframe,\mu} = N_{symb}^{slot} N_{slot}^{subframe,\mu}$.

Each frame may include two equal-sized half frames. The half frames may include subframe 0 to subframe 4, and subframe 5 to subframe 9, respectively.

For an SCS $\mu$, slots are numbered with in $n_s^\mu \in \{0, \ldots, N_{slot}^{subframe, \mu}-1\}$ in an ascending order in a subframe, and with $n_{s,f}^\mu \in \{0, \ldots, N_{slot}^{subframe,\mu}-1\}$ in an ascending order in a frame. The number $N_{symb}^{slot}$ of contiguous OFDM symbols in one slot may be determined as listed in the following table. The starting slot $n_s^\mu$ of a subframe is aligned in the time domain with the starting OFDM symbol $n_s^\mu N_{symb}^{slot}$ of the subframe. Table 4 below lists the numbers of OFDM symbols per slot/per frame/per subframe in a normal CP case, and Table 5 below lists the numbers of OFDM symbols per slot/per frame/per subframe in an extended CP case.

TABLE 11

| $\mu$ | $N_{symb}^{slot}$ | $N_{slot}^{frame, \mu}$ | $N_{slot}^{subframe, \mu}$ |
| --- | --- | --- | --- |
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 12

| μ | $N_{symb}^{slot}$ | $N_{slot}^{frame, \mu}$ | $N_{slot}^{subframe, \mu}$ |
|---|---|---|---|
| 2 | 12 | 40 | 4 |

The NR system to which the present disclosure is applicable may adopt a self-contained slot structure.

Figure 5:
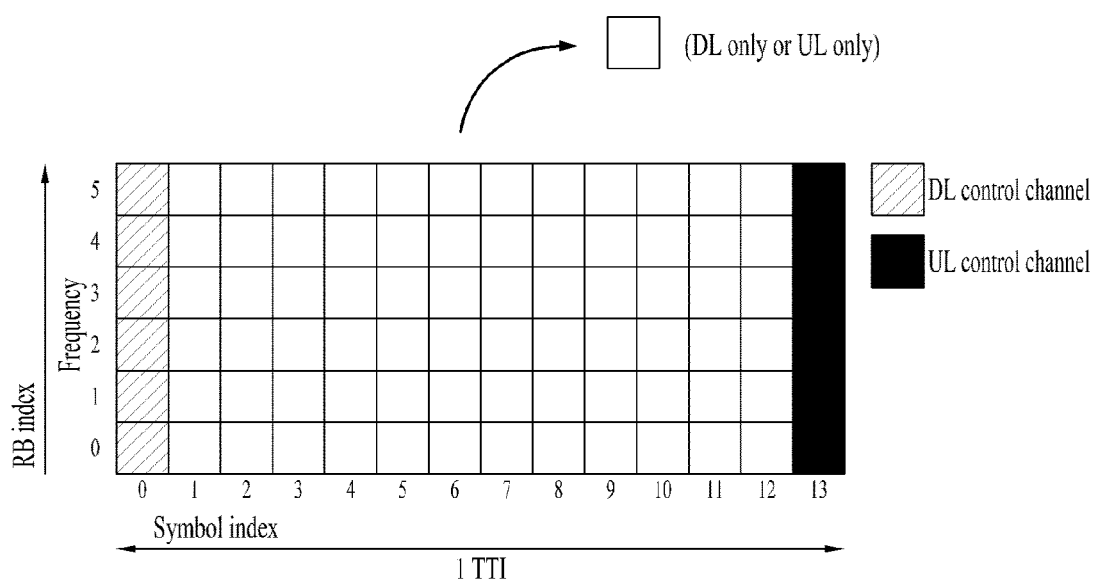
FIG. 5 is a diagram referred to for describing a self-contained structure in a new radio access technology (NR) system.

FIG. 5 is a diagram illustrating a self-contained slot structure applicable to the present disclosure.

In FIG. 5, the slashed area (e.g., symbol index=0) represents a DL control region, and the black area (e.g., symbol index=13) represents a UL control region. The remaining area (e.g., symbol index=1 to 12) may be used for DL or UL data transmission.

According to this structure, a BS and a UE may sequentially perform DL transmission and UL transmission in one slot. Further, the BS and the UE may transmit and receive DL data and a UL ACK/NACK for the DL data in the slot. When an error occurs during a data transmission, this structure may reduce a time taken for a data retransmission and thus minimize the latency of a final data transmission.

In this self-contained slot structure, there is a need for a time gap of a predetermined length for Tx-to-Rx or Rx-to-Tx switching of the BS and the UE. For this purpose, some OFDM symbol at the time of DL-to-UL switching may be configured as a guard period (GP) in the self-contained slot structure.

While the self-contained slot structure has been described above as including both of the DL control region and the UL control region, the control regions may be selectively included in the self-contained slot structure. In other words, the self-contained slot structure according to the present disclosure may include only the DL control region or the UL control region as well as both of the DL and UL control regions.

For example, a slot may be configured in various slot formats. In each slot, an OFDM symbol may be classified as DL (denoted by 'D'), flexible (denoted by 'X'), or UL (denoted by 'U').

Accordingly, the UE may assume that a DL transmission takes place only in 'D' and 'X' symbols. Likewise, the UE may assume that a UL transmission takes place only in 'U' and 'X' symbols.

Now, analog beamforming will be described.

In a millimeter wave (mmW), a wavelength is short, which enables installation of multiple antenna elements over the same area. That is, a total of 100 antenna elements may be installed in a two-dimensional array on a 5*5 cm panel at intervals of 0.5 lambda (wavelength) in a 30 GHz band with a wavelength of 1 cm. In mmW, therefore, coverage may be enhanced or throughput may be increased, by increasing a beamforming gain using multiple antenna elements in mmW.

Each antenna element may include a transceiver unit (TXRU) to enable transmission power control and phase control on an antenna element basis. Thus, each antenna element may perform independent beamforming in each frequency resource.

However, installation of TXRUs for all of about 100 antenna elements is not viable in terms of cost effectiveness. Accordingly, a method of mapping multiple antenna elements to one TXRU and controlling the direction of a beam by an analog phase shifter is under consideration. Because only one beam direction is generated across a total band, frequency selective beamforming is difficult in analog beamforming.

As a solution to the above problem, an intermediate scheme between digital beamforming and analog beamforming, hybrid beamforming may be considered, in which there are B TXRUs fewer than Q antenna elements. The number of the directions of beams which may be simultaneously transmitted is limited to B or less in hybrid beamforming, although the number of the directions of beams varies depending on how the B TXRUs are connected to the Q antenna elements.

Figure 6:
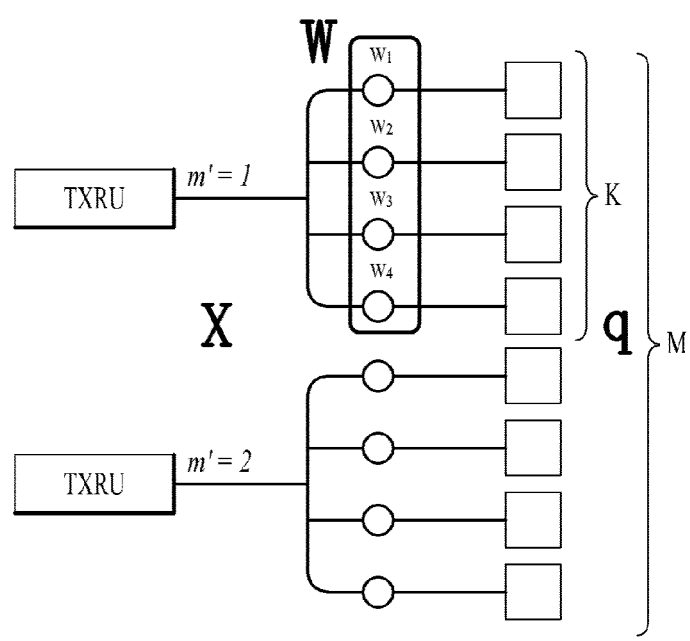
FIGS. 6 and 7 are diagrams referred to for describing schemes of connecting transceiver units (TXRUs) to antenna elements.
Figure 7:
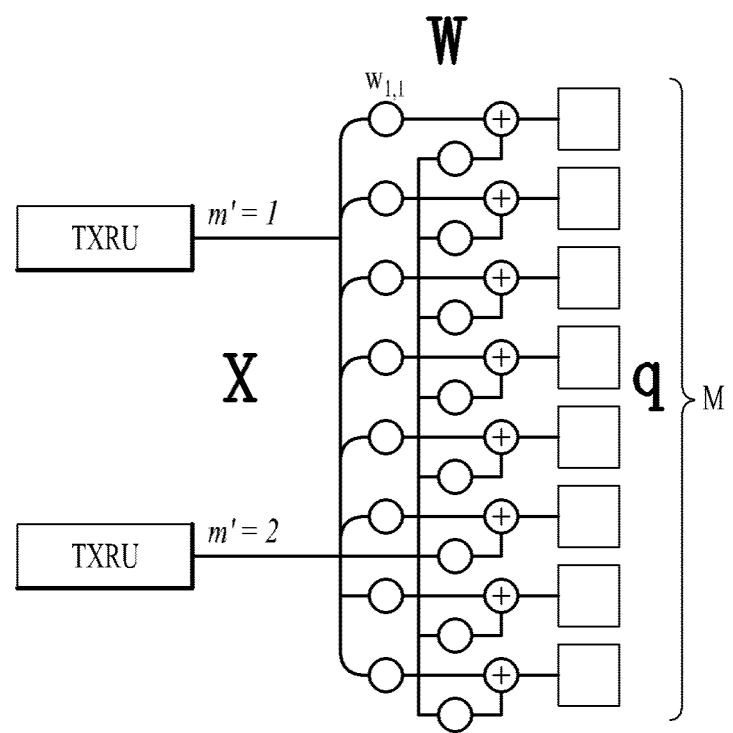

FIGS. 6 and 7 are diagrams illustrating representative methods of connecting TXRUs to antenna elements. The TXRU virtualization model represents the relationship between TXRU output signals and antenna element output signals.

FIG. 6 illustrates a method of connecting TXRUs to sub-arrays. In FIG. 6, one antenna element is connected only to one TXRU.

Figure 8:
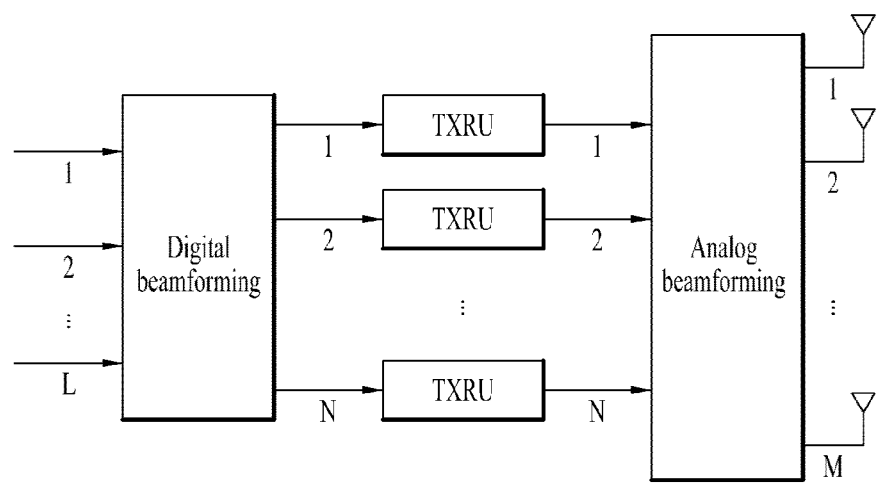
FIG. 8 is a diagram referred to for describing hybrid beamforming.

In contrast, FIG. 7 illustrates a method of connecting each TXRU to all antenna elements. In FIG. 7, each antenna element is connected to all TXRUs. To enable connection between each antenna element and all TXRUs, adders are additionally required, as illustrated in FIG. 8.

In FIGS. 6 and 7, W represents a phase vector weighted by an analog phase shifter. That is, W is a major parameter determining the direction of analog beamforming. In this case, CSI-RS antenna ports and TXRUs may be mapped in a one-to-one or one-to-many correspondence.

Despite difficult beamforming focusing, the configuration illustrated in FIG. 6 offers the benefit that an overall antenna configuration costs low.

On the contrary, the configuration illustrated in FIG. 7 advantageously facilitates beamforming focusing. However, because each TXRU is connected to all antenna elements, overall cost increases.

When a plurality of antennas is used in the NR system to which the present disclosure is applicable, hybrid beamforming with digital beamforming and analog beamforming in combination may be applied. Analog beamforming (or radio frequency (RF) beamforming) means an operation of performing precoding (or combining) at an RF end. In hybrid beamforming, each of a baseband end and an RF end perform precoding (or combining). Therefore, hybrid beamforming may advantageously achieve performance close to that of digital beamforming, with a smaller number of RF chains and a smaller number of digital-to-analog (D/A) (or analog-to-digital (A/D)) converters.

For the convenience of description, a hybrid beamforming structure may be represented by N TXRUs and M physical antennas. Digital beamforming for L data layers to be transmitted by a transmitter may be expressed as an N*L (N-by-L) matrix. Then, N converted digital signals are converted to analog signals via the TXRUs and then subjected to analog beamforming expressed as an M*N (M-by-N) matrix.

FIG. 8 is a diagram illustrating a simplified hybrid beamforming structure from the perspective of TXRUs and physical antennas. In FIG. 8, the number of digital beams is L and the number analog beams is N.

Additionally in the NR system, a method of designing a BS to change analog beamforming at a symbol level and thus support more efficient beamforming for a UE located in a specific area is under consideration. Furthermore, when N specific TXRUs and M RF antennas are defined as one antenna panel as illustrated in FIG. 8, the introduction of a plurality of antenna panels to which independent hybrid beamforming is applicable is under consideration in the NR system according to the present disclosure.

When the BS uses a plurality of analog beams as described above, different analog beams may be suitable for signal reception at different UEs. Therefore, in the NR system to which the present disclosure is applicable, a beam sweeping operation is considered, in which the BS transmits a signal (at least a synchronization signal, system information, paging, or the like) by applying a different analog beam to each symbol in as specific subframe (SF) so that all UEs may have reception opportunities.

In a communication system such as LTE, an interference measurement resource (IMR) based on a zero power channel state information-reference signal (ZP CSI-RS) is used to measure inter-cell interference. In this method, one of existing resources available for the ZP CSI-RS is selected and CSI is derived from interference measured in the selected resource. In an environment such as coordinated multi-point transmission and reception (CoMP), eNBs of a CoMP set may coordinate with each other through rate matching such that interference for a CoMP scenario assumed between the eNBs is measured in a corresponding IMR.

This interference measurement method has limitations because data transmitted by other eNBs is measured as interference. In a multi-user (MU) scenario, for example, an eNB should consider a larger number of interference hypotheses, thus having difficulty in configuring an IMR. In this context, a non-zero power (NZP) CSI-RS-based IMR is considered as an IMR in a communication system such as New RAT. In such an IMR, the eNB emulates assumed interference by using the NZP CSI-RS and transmits the emulated interference to a UE. Therefore, a smaller number of configured resources may be used in measuring interference in various interference situations.

As a method of using the above-described NZP CSI-RS-based IMR by configuring a smaller number of resources, port-wise interference measurement may be considered. The eNB may transmit different interference for each port in one IMR, and the UE may accordingly calculate/report CSI, assuming a different interference situation for each port. This method may reduce resource overhead. For example, there may be a double difference in resource use between a port-wise IMR using two code division multiplexed (CDMed) ports and a 2-RE NZP CSI-RS-based IMR.

For this purpose, the eNB may configure a port-wise IMR (PIMR) for the UE. Compared to other IMRs, a different interference hypothesis is taken for each port in the PIMR. With knowledge of different hypotheses being applied to different ports, the UE measures interference independently for each port. To distinguish a PIMR from another IMR, an IMR type indicator may be included in an IMR configuration to indicate whether a corresponding IMR is a ZP CSI-RS-based IMR, a NZP CSI-RS-based IMR, or a PIMR. Alternatively, an RS type for CSI indicator may be included to provide information indicating whether an RS is an NZP CSI-RS for channel measurement. The RS type for CSI indicator may be configured for the UE by RRC signaling.

For the convenience of description, proposed methods will be described in the context of a 3GPP New RAT system. However, the system to which the proposed methods are applied may be extended to other systems (e.g., LTE, UTRA, and so on) as well as the 3GPP New RAT system. The term used herein, BS is interchangeably used with eNB, gNB, sector, transmission point (TP), reception point (RP), remote radio head (RRH), relay, and so on, and used as a generic term to distinguish component carriers (CCs) from each other at a specific transmission and reception point.

CSI may be calculated by using the above-described PIMR as follows.

Alt 1: CSI is Calculated by Regarding the Sum of Interference Measurements of Respective Ports as One Interference Measurement.

The UE regards the sum of interference measurements of respective ports as one interference measurement and selects a receiver filter for the interference sum to calculate and report CSI. For example, when a 4-port PIMR is configured for the UE, the UE may calculate and report CSI by selecting a receiver filter, while regarding the sum (I1+I2+I3+I4) of four interference measurements of the ports, I1, I2, I3, and I4 as actual interference.

Particularly in this case, the eNB may emulate interference on a port basis irrespective of a UE operation. For example, even though the eNB does not provide interference for a specific port, the UE may measure total interference. Even though the eNB does not emulate interference for the third port, that is, I3=0 among I1, I2, I3, and I4, the UE may operate transparently.

To further save resources, a ZP IMR port may be configured in the PIMR, rather than an IMR is configured based on a ZP CSI-RS. The corresponding port may be used as a 'ZP IMR port'. In other words, the eNB may allow the UE to measure only inter-cell interference in the ZP IMR port, which is commonly measured for each port in the PIMR, and the UE may calculate CSI in consideration of emulated interference measured for each port and the inter-cell interference. Particularly, when the IMR ports are CDMed, the measured inter-cell interference (particularly, noise) is preferably identical to interference that actual data experiences. Accordingly, the ZP IMR port may be limited to a port using a Walsh code {+1, +1}. Because this port generally has the lowest port number, the ZP IMR port may be limited to a port having the lowest index. The UE measures interference in the ZP IMR port in the same manner as in an LTE ZP CSI-RS, without using a sequence as used for the NZP CSI-RS. The interference/noise measured in the ZP IMR port is added to interference measurements of the other ports, and used for CSI calculation.

The PIMR may include only ports distinguished in CDM in the same RE pattern. This method is advantageous in that there is no change in a resource configuration irrespective of the number of pieces of interference that the eNB is to emulate (however, the number of pieces of interference should be less than a maximum number of ports). For example, if two ports in an IMR using 2 REs and length-2 CDM are distinguished by Walsh codes {+1, +1} and {+1, −1} and the eNB emulates and transmits different interference I1 and I2 for the ports, the interference I1 and I2 and noise n measured commonly in the PIMR ports are given as illustrated in FIGS. 5, 6, and 7.

For an IMR port using the Walsh code {+1, +1}, I2 may be cancelled and thus I1+noise may be measured, whereas for the other IMR port using the Walsh code {+1, −1}, I1 and noise may be cancelled and thus I2 may be measured.

Accordingly, the measurement results of the ports are I1 and I2 that the eNB intends.

Figure 9:
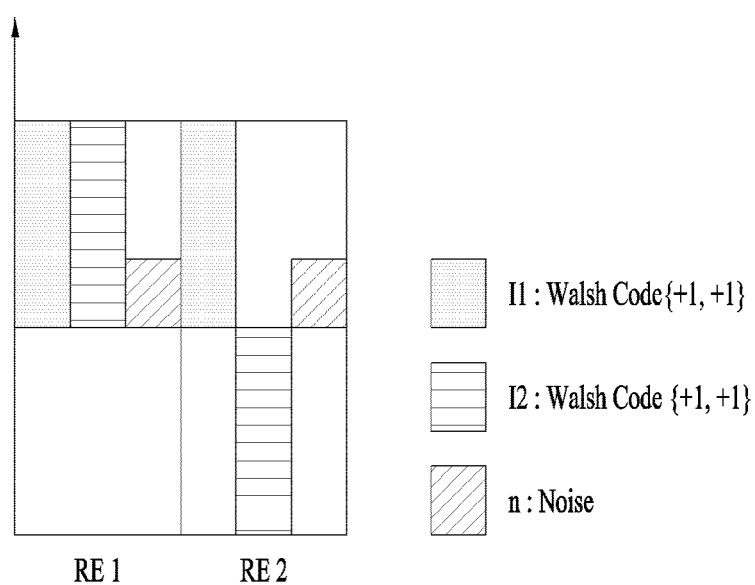
FIG. 9 is a diagram illustrating an interference resource including two resource elements (REs) to which different Walsh codes are applied and in which the same interference exists.
Figure 10:
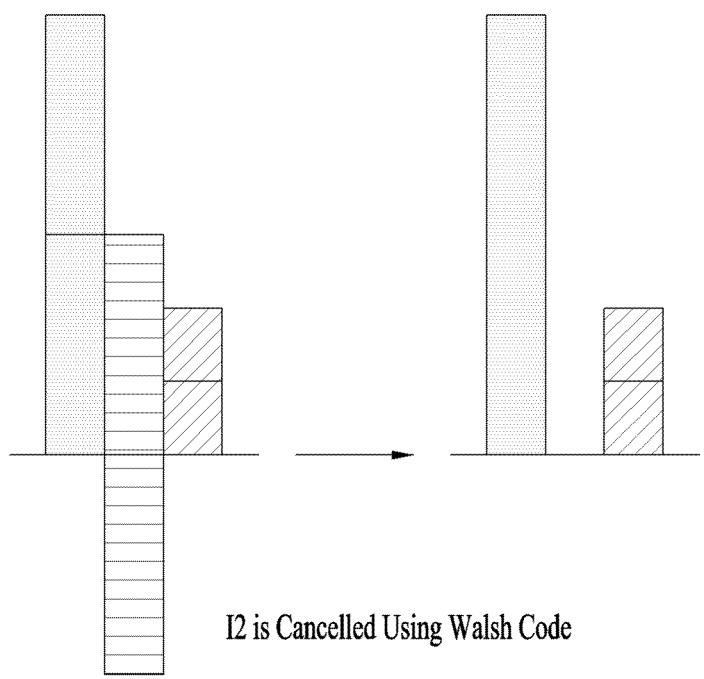
FIGS. 10 and 11 are diagrams illustrating results of interference measurement based on Walsh codes.
Figure 11:
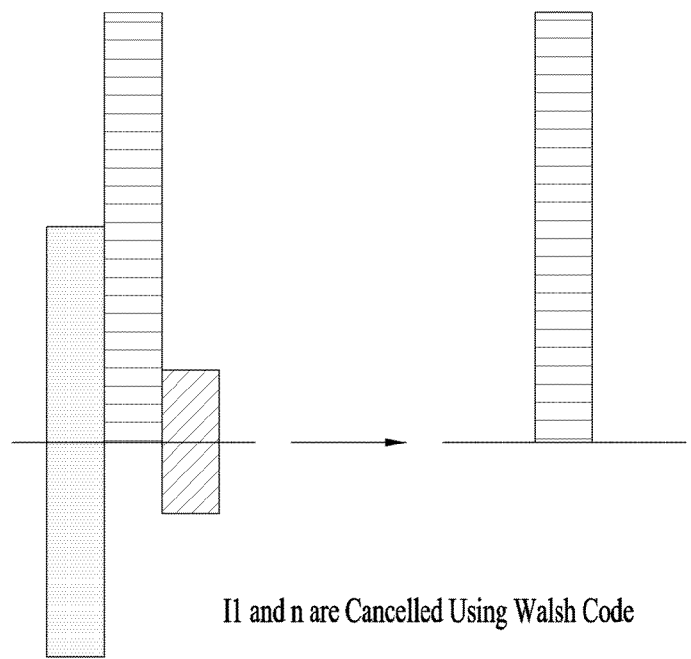
Figure 12:
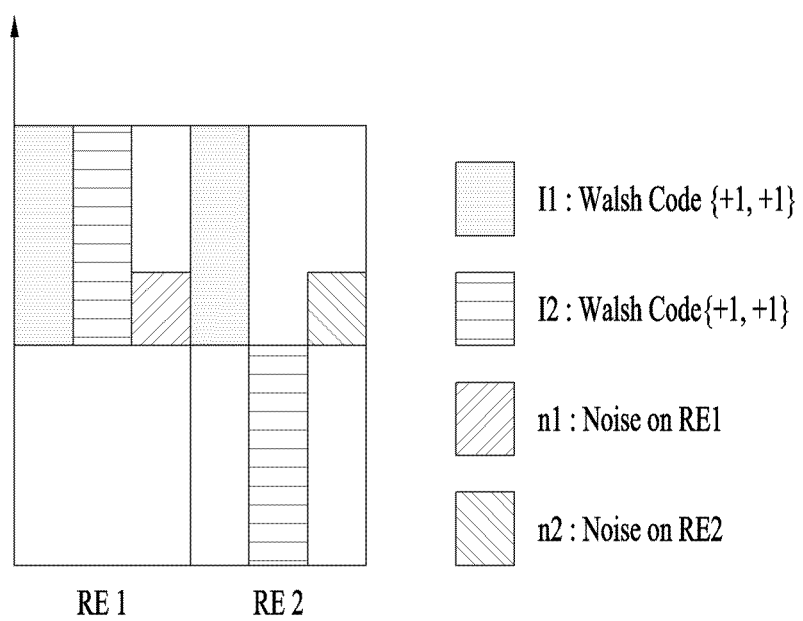
FIG. 12 is a diagram illustrating an interference resource including two REs to which different Walsh codes are applied and in which different interference exists.
Figure 13:
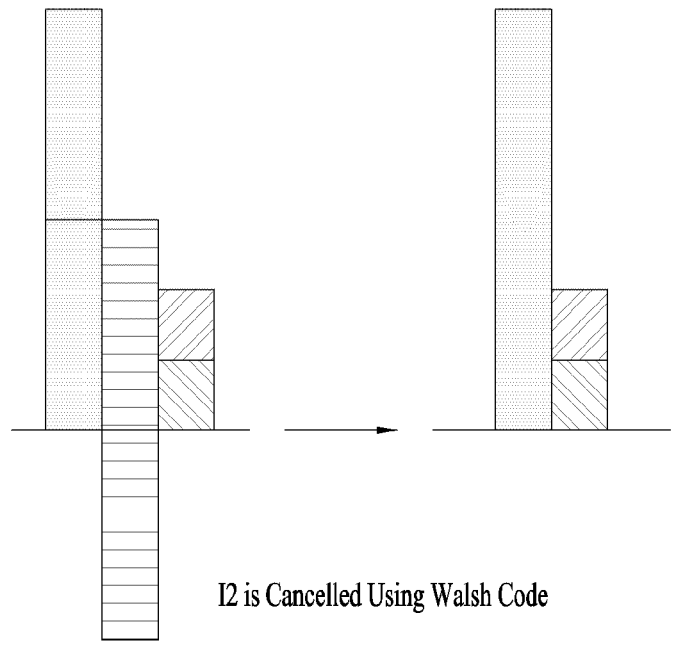
FIG. 13 is a diagram illustrating results of interference measurement based on Walsh codes.
Figure 13:
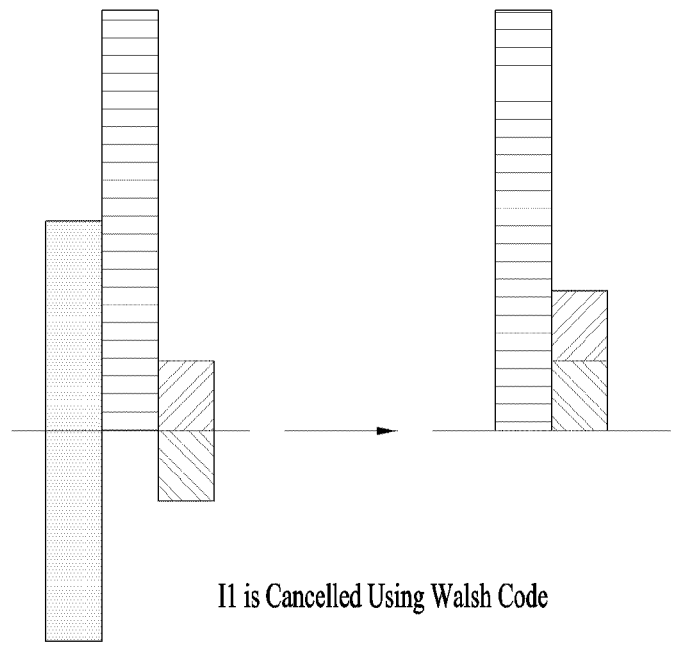

The above operation may be performed in a similar manner even when different noise instead of the same noise n is measured in each RE (e.g., due to inaccurate measurement), as illustrated in FIGS. 8 and 9.

In this case, when noise n1 and noise n2 measured respectively in the REs are independent of each other, such as Gaussian noise, the sum of or difference between the noises may be regarded as new noise n3 having similar characteristics. This may be treated simply like partial interference being included during measurement. In other words, interference measured for the CDMed ports are the same as interference measured for an individual port. The use of such a PIMR with CDMed ports enables more accurate emulation/measurement of interference by increasing power relative to noise, because the power may be boosted by borrowing the power of other CSI-RS ports through CDM, particularly CDM-time (CDM-T, CDM in a time direction).

Alt 2: CSI is Calculated/Reported on the Assumption that Interference Measured for Each Port is an Independent Hypothesis.

Alt 2 is identical to Alt 1 in terms of PIMR configuration and emulation and transmission of different interference for each port by an eNB. Compared to Alt 1, however, the UE calculates CSI, assuming that interference for each port is an independent interference hypothesis, without summing interference of PIMR ports. Particularly in this case, the UE may determine a port from among the transmitted PIMR ports, of which the interference is to be used actually in calculating and/or reporting CSI, as follows.

Alt 2-1: The Index of a Port Having the Best CQI Among Interference Hypotheses of Respective Ports is Reported.

This method may be used when the UE is allowed to determine a candidate MU pair, for MU scheduling. The UE reports, to the eNB, the index of a port with interference leading to the best CQI from interference of the respective PIMR ports. This may be calculated and reported with other CSI, particularly a CQI.

In the case of periodic reporting, if only a CQI and a PIMR port index (PPI) are transmitted and a PMI is not necessarily reported at the same time, the UE calculates and/or reports the CQI and PPI based on the most recently calculated/reported PMI.

In periodic reporting, when the CQI and the PPI are not necessarily reported at the same time, the CQI may be calculated and/or reported based on an interference measurement of an IMR port corresponding to the most recently reported PPI.

Alt 2-2: CSI is Calculated/Reported by Using Interference Measurements of Ports Indicated by an eNB.

This method may be used when a corresponding PIMR is shared among a plurality of UEs, and emulated interference for a specific UE (group) is transmitted through each port. In this case, the eNB may transmit port index(s) in DCI to the UEs, and the UEs may calculate and/or report CSI by using interference measurements of the ports of the indexes. In particular, when the eNB uses a plurality of port indexes, a UE may calculate and/or report CSI, assuming the sum of interference measurements of all of the indicated ports as one interference measurement. Such port index(es) may be jointly encoded and transmitted with an aperiodic CSI request.

Alt 2-3: A Target CQI is Set, and Port Index(s) Showing an Interference Level that Satisfies the Target CQI is Reported to an eNB.

The UE may report to the eNB port index(es) with interference satisfying a target CQI among interference measurements of the respective ports in a given PIMR. In particular, when the UE reports a plurality of port indexes, this may imply that for ports corresponding to the plurality of port indexes, 1) an individual CQI derived from assumed interference of each port exceeds the target CQI, or 2) a CQI derived by assuming that the sum of interference measurements of the ports as one interference measurement exceeds the target CQI.

In the case of 2), the number of interference ports satisfying the target CQI, particularly a combination of most ports may be reported first to the eNB. Then, a port group that may be produced for the target CQI may be reported to the eNB by a bitmap instead of port indexes, which may be limited to an aperiodic CSI feedback.

Since the reporting of the bitmap causes large overhead, interference combinations may be limited in order to simplify the reporting. In one method, an interference candidate is transmitted through each port of the PIMR, in the form of the first interference, second interference, . . . from the lowest port index, and the UE may sequentially add the interference transmitted through each port and report the number of ports satisfying the target CQI to the eNB. For example, when the eNB configures the UE with a 4-port PIMR, the UE may report to the eNB one of four cases: no interference in the indicated PIMR, one interference port (interference with the first port), two interference ports (interference with the first and second ports), and three interference ports (interference with the first, second and third ports).

Similarly, the eNB may indicate a tolerable CQI drop of a CQI to the UE. Since the eNB may predict to some extent a network-side throughput increase of an MU CQI relative to a single-user (SU) CQI, the eNB may indicate a tolerable CQI drop of a CQI to the UE, which may be beneficial to the network, and the UE may report to the eNB port index(es) with interference within a range that satisfies the tolerable CQI drop relative to a (most recently reported) SU CQI. In this case, the UE may calculate and report an actual decrease (i.e., CQI drop) of the CQI.

The eNB may signal a target CQI and/or a maximum CQI drop to the UE. This may be included in a reporting setting by signaling such as RRC signaling. When used for aperiodic CSI reporting, this may be signaled to the UE by DCI.

Alt 2-4: CSI for Each Individual IMR Port is Calculated/Reported on the Assumption that an Interference Measurement of Each Port is an Independent Hypothesis (CSI Only for a Part of IMR Ports is Reported in the Foregoing Alts).

In this method, the eNB allows the UE to measure and/or report all CSI for possible interference, for MU scheduling for a suitable UE among MU candidates. Since large payload is required to report the entire CSI as such, this method may be limited to the use of large payload as in aperiodic reporting.

Alternatively, in periodic reporting, this method may be used only for a long PUCCH operation, not for a short PUCCH operation. In this case, another reporting method (e.g., an existing CSI reporting method or Alt 2-1) may be used together. This reporting method may reduce feedback overhead through reporting on a short PUCCH. For a similar purpose, this method (i.e., Alt 2-4) may use a relatively long reporting period, whereas another reporting method (e.g., the existing CSI reporting method or Alt 2-1) may use a relatively short reporting period.

To configure the above-described PIMR, the eNB may signal a configuration including the whole or part of the following information to the UE by higher-layer signaling such as RRC signaling.

1. RE pattern
   A. Resource configuration
2. CDM length/direction such as {CDM-F (i.e., frequency-direction CDM), length-2} or {CDM-TF (i.e., time and frequency-direction CDM), length-4}
   A. As described above, only a specific CDM such as {CDM-F, length-2} may be used. Then, a separate configuration is not needed. Particularly when only a specific CDM is considered, the configuration may be simplified to, for example, CDM on/off.

B. When only ports of the same CDM group are restrictively used, the CDM length/direction matches the RE pattern, which may obviate the need for such a configuration.

3. Frequency granularity

A. A PIMR may be configured in a wideband/partial band (bandwidth part).

i. Preferably, different PIMRs are configured in bandwidth parts having different numerologies.

ii. Particularly, a smaller PIMR may be transmitted in one bandwidth part. For this purpose, a band configuration (e.g., a starting RB index and a length) may be included separately.

iii. Without any separate configuration, an NZP CSI-RS for CSI calculation may be followed.

4. Frequency resource for each port

A. Apart from a frequency granularity, a frequency area may be configured for each port, for interference measurement. In this case, when interference of the respective ports is summed, per-port interference to be measured in each frequency area (e.g., RB) is based on a frequency area configuration for each port. When an inter-port operation such as per-port interference summation is performed, the operation may be performed only for ports configured for measurement in the frequency area.

5. Timing behavior

A. It is configured whether a corresponding PIMR is aperiodic, semi-persistent, or periodic.

i. When the PIMR is semi-persistent or periodic, its periodicity may be configured.

B. When the PIMR is limited to an aperiodic PIMR, a periodicity configuration may not be used separately. In this case, a timing at which interference is measured in a corresponding resource may be indicated by DCI. The DCI may be jointly encoded with an aperiodic CSI request.

C. A periodicity may be configured for each port. With the periodicity, the UE may need to measure actual interference in the port irrespective of transmission of the PIMR.

6. Quasi-co-located (QCL)

A. Because different interference may be assumed according to a transmitting TRP, a QCL parameter may be included to determine the TRP. To allow the UE to determine a receiver beam in which interference is to be measured, at least a spatial QCL parameter (i.e., the receiver beam of the UE may be indicated by indicating an RS representing a transmission beam of the eNB, for example, a CSI-RS) may be included.

B. Without a separate configuration, an NZP CSI-RS for CSI calculation may be followed.

7. Time-wise measurement restriction (MR)

A. Because a port configuration is subject to a dynamic change, MR on is always assumed (i.e., post-processing such as averaging is not performed on the assumption that interference measurement results at different timings are different interference). In this case, an MR configuration may not be given separately.

B. For a periodic/semi-persistent PIMR, a port-wise MR may be configured. This is an operation of turning MR on or off differently for each port.

i. In addition to an existing resource-wise MR (i.e., interference measurements of the same resources may be averaged), one of three MR types: resource-wise MR, port-wise MR, and no MR may be configured for the UE.

In this case, resource-wise MR off may be interpreted as port-wise MR off in all ports.

8. Frequency MR

A. To measure interference stably, the size of frequency resources (e.g., a resource block group (RBG)) in which equal interference may be assumed (i.e., the same precoding may be assumed) may be configured. This may be configured simply by signaling MR on/off.

Frequency MR on/off or an MR group size may be configured differently for each port on the assumption of use of a different PRG size for interference.

9. Emulated interference power

A. This is a configuration specifying a degree to which measured interference power is to be corrected in actual CSI calculation.

Although a port-wise configuration has been described separately in a meaningful part of the description of the above configuration, a different configuration may be made for each port even in a part which has not been described separately.

Particularly for higher flexibility, a plurality of PIMRs may be configured for the UE by RRC signaling as described above, and a PIMR to be used for actual interference measurement may be indicated to the UE by DCI. In order to reduce DCI overhead, a PIMR set to be indicated by DCI may be selected by MAC signaling, or a PIMR may be selected by MAC signaling without DCI signaling for PIMR selection.

In addition to a PIMR, a role may be assigned separately to each port within one resource. In other words, in addition to the above-described NZP-based IM port, each port may be classified as a channel measurement port (CMR) and/or an NZP-based IM port and/or a ZP IMR port, which may be configured within one resource. The eNB may configure the port configuration in the resource for the UE by higher-layer signaling such as RRC signaling.

A 'port' in a PIMR as defined in the present disclosure is a kind of resource group unit defined in the IMR. For example, the port may have the same configuration as the port configuration of an NZP CSI-RS having the same structure (i.e., in terms of the number of ports of the IMR (or the number of REs per RB included in one IMR), frequency/time-wise RE positions, and CDM pattern). The eNB may be extended to allow the UE to measure interference on a certain port group basis, for more accurate interference measurement and thus to signal or configure corresponding port grouping for the UE. For example, the eNB may configure the indexes of ports included in a port group for the UE by higher-layer signaling such as RRC signaling, or may simply configure the number of ports (e.g., 1, 2, or 4 ports) per port group by higher-layer signaling so that the UE may determine that as many PIMR ports as the configured number from the lowest-index port are included in the corresponding port group. In this case, the UE may measure interference (e.g., calculate average interference), assuming that equal interference is transmitted in the port group (e.g., the UE may calculate the average interference).

Figure 14:
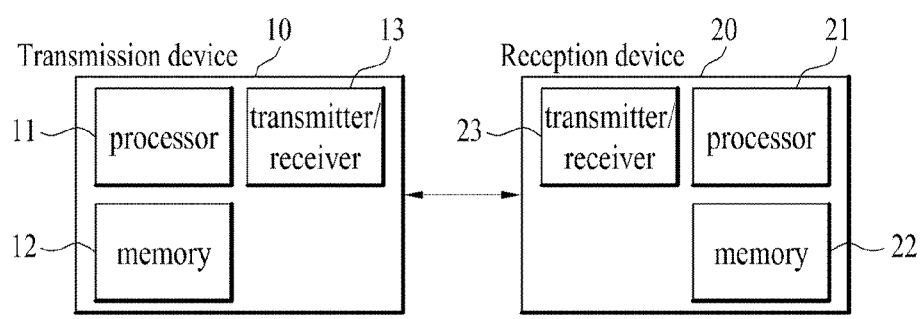
FIG. 14 is a block diagram illustrating devices configured to implement embodiment(s) of the present disclosure.

FIG. 14 is a block diagram of a transmitting device 10 and a receiving device 20 configured to implement exemplary embodiments of the present disclosure. The transmitting device 10 and the receiving device 20 respectively include transmitter/receiver 13 and 23 for transmitting and receiving radio signals carrying information, data, signals, and/or messages, memories 12 and 22 for storing information related to communication in a wireless communication system, and processors 11 and 21 connected operationally to the transmitter/receiver 13 and 23 and the memories 12 and 22 and configured to control the memories 12 and 22 and/or the transmitter/receiver 13 and 23 so as to perform at least one of the above-described embodiments of the present disclosure.

The memories 12 and 22 may store programs for processing and control of the processors 11 and 21 and may temporarily storing input/output information. The memories 12 and 22 may be used as buffers. The processors 11 and 21 control the overall operation of various modules in the transmitting device 10 or the receiving device 20. The processors 11 and 21 may perform various control functions to implement the present disclosure. The processors 11 and 21 may be controllers, microcontrollers, microprocessors, or microcomputers. The processors 11 and 21 may be implemented by hardware, firmware, software, or a combination thereof. In a hardware configuration, Application Specific Integrated Circuits (ASICs), Digital Signal Processors (DSPs), Digital Signal Processing Devices (DSPDs), Programmable Logic Devices (PLDs), or Field Programmable Gate Arrays (FPGAs) may be included in the processors 11 and 21. If the present disclosure is implemented using firmware or software, firmware or software may be configured to include modules, procedures, functions, etc. performing the functions or operations of the present disclosure. Firmware or software configured to perform the present disclosure may be included in the processors 11 and 21 or stored in the memories 12 and 22 so as to be driven by the processors 11 and 21.

The processor 11 of the transmitting device 10 is scheduled from the processor 11 or a scheduler connected to the processor 11 and codes and modulates signals and/or data to be transmitted to the outside. The coded and modulated signals and/or data are transmitted to the transmitter/receiver 13. For example, the processor 11 converts a data stream to be transmitted into K layers through demultiplexing, channel coding, scrambling and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the transmitter/receiver 13 may include an oscillator. The transmitter/receiver 13 may include Nt (where Nt is a positive integer) transmit antennas.

A signal processing process of the receiving device 20 is the reverse of the signal processing process of the transmitting device 10. Under the control of the processor 21, the transmitter/receiver 23 of the receiving device 10 receives RF signals transmitted by the transmitting device 10. The transmitter/receiver 23 may include Nr receive antennas and frequency down-converts each signal received through receive antennas into a baseband signal. The transmitter/receiver 23 may include an oscillator for frequency down-conversion. The processor 21 decodes and demodulates the radio signals received through the receive antennas and restores data that the transmitting device 10 wishes to transmit.

The transmitter/receiver 13 and 23 include one or more antennas. An antenna performs a function of transmitting signals processed by the transmitter/receiver 13 and 23 to the exterior or receiving radio signals from the exterior to transfer the radio signals to the transmitter/receiver 13 and 23. The antenna may also be called an antenna port. Each antenna may correspond to one physical antenna or may be configured by a combination of more than one physical antenna element. A signal transmitted through each antenna cannot be decomposed by the receiving device 20. An RS transmitted through an antenna defines the corresponding antenna viewed from the receiving device 20 and enables the receiving device 20 to perform channel estimation for the antenna, irrespective of whether a channel is a single RF channel from one physical antenna or a composite channel from a plurality of physical antenna elements including the antenna. That is, an antenna is defined such that a channel transmitting a symbol on the antenna may be derived from the channel transmitting another symbol on the same antenna. A transmitter/receiver supporting a MIMO function of transmitting and receiving data using a plurality of antennas may be connected to two or more antennas.

In embodiments of the present disclosure, a UE serves as the transmission device 10 on UL and as the receiving device 20 on DL. In embodiments of the present disclosure, an eNB serves as the receiving device 20 on UL and as the transmission device 10 on DL.

The transmitting device and/or the receiving device may be configured as a combination of one or more embodiments of the present disclosure.

In one of combinations of these proposals, a UE for measuring interference in a wireless communication system according to another embodiment of the present disclosure includes a transceiver and a processor configured to control the transceiver. The processor is configured to receive a configuration related to the port-wise interference measurement resource, the port-wise interference measurement resource being related to an independent interference hypothesis for each port, and measure interference for each port in the port-wise interference measurement resource and reporting a measurement result. The measurement result may include an index of a port having a CQI exceeding a target CQI.

The measurement result may include indexes of a plurality of ports, and a CQI based on interference for each of the plurality of ports may exceed the target CQI.

Alternatively, the measurement result may include indexes of a plurality of ports, and a CQI derived based on total interference of the plurality of ports may exceed the target CQI.

Alternatively, the measurement result may include information about indexes of a plurality of port groups, and each of the port groups may include a plurality of ports, each port having a CQI derived based on total interference of the plurality of ports exceeding the target CQI.

Alternatively, the processor may be configured to receive information related to a CQI drop, and report an index of a port for which interference within a range satisfying the CQI drop has been measured.

The configuration related to the port-wise interference measurement resource may include a port-wise MR.

The configuration related to the port-wise interference measurement resource may include information indicating whether each port is a channel measurement port, a non-zero power interference measurement port, or a zero power interference measurement port, for each interference measurement resource.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

INDUSTRIAL APPLICABILITY

The present disclosure may be used for a wireless communication apparatus such as a UE, a relay, and an eNB.

The invention claimed is:

1. A method of measuring interference in a port-wise interference measurement resource and reporting the interference by a user equipment (UE) in a wireless communication system, the method comprising:
receiving a configuration related to the port-wise interference measurement resource, the port-wise interference measurement resource being related to an independent interference hypothesis for each port;
measuring interference for each port in the port-wise interference measurement resource; and
reporting a measurement result,
wherein the measurement result includes information about indexes of a plurality of port groups, and each of the port groups includes a plurality of ports, each port having a channel quality indicator (CQI) derived based on a total interference of the plurality of ports exceeding a target CQI.

2. The method of claim 1, further comprising:
receiving information related to a CQI drop; and
reporting an index of a port for which interference within a range satisfying the CQI drop has been measured.

3. The method of claim 1, wherein the configuration related to the port-wise interference measurement resource includes a port-wise measurement restriction (MR).

4. The method of claim 1, wherein the configuration related to the port-wise interference measurement resource includes information indicating whether each port is a channel measurement port, a non-zero power interference measurement port, or a zero power interference measurement port, for each interference measurement resource.

5. A user equipment (UE) for measuring interference in a wireless communication system, the UE comprising:
a transceiver; and
a processor configured to control the transceiver,
wherein the processor is further configured to:
receive a configuration related to a port-wise interference measurement resource, the port-wise interference measurement resource being related to an independent interference hypothesis for each port,
measure interference for each port in the port-wise interference measurement resource, and
report a measurement result,
wherein the measurement result includes information about indexes of a plurality of port groups, and each of the port groups includes a plurality of ports, each port having a channel quality indicator (CQI) derived based on a total interference of the plurality of ports exceeding a target CQI.

6. The UE of claim 5, wherein the processor is configured to receive information related to a CQI drop, and report an index of a port for which interference within a range satisfying the CQI drop has been measured.

7. The UE of claim 5, wherein the configuration related to the port-wise interference measurement resource includes a port-wise measurement restriction (MR).

8. The UE of claim 5, wherein the configuration related to the port-wise interference measurement resource includes information indicating whether each port is a channel measurement port, a non-zero power interference measurement port, or a zero power interference measurement port, for each interference measurement resource.

* * * * *